US008191226B2

(12) United States Patent
Avnon

(10) Patent No.: US 8,191,226 B2
(45) Date of Patent: Jun. 5, 2012

(54) DEVICE AND METHOD FOR COUPLING A PIPE FITTING TO A PIPE

(75) Inventor: Moty Avnon, Kibbutz Mashabay Sadeh (IL)

(73) Assignee: Sagiv Shitfut Chaklait Be'am, Kibbutz Mashabay Sadeh (IL)

( * ) Notice: Subject to any disclaimer, the term of this patent is extended or adjusted under 35 U.S.C. 154(b) by 641 days.

(21) Appl. No.: 12/374,310

(22) PCT Filed: Jul. 23, 2007

(86) PCT No.: PCT/IL2007/000925

§ 371 (c)(1), (2), (4) Date: Jan. 18, 2009

(87) PCT Pub. No.: WO2008/012811

PCT Pub. Date: Jan. 31, 2008

(65) Prior Publication Data

US 2009/0260216 A1 Oct. 22, 2009

(30) Foreign Application Priority Data

Jul. 23, 2006 (IL) ......................................... 177036

(51) Int. Cl.
*B23P 19/02* (2006.01)
*B23P 19/04* (2006.01)

(52) U.S. Cl. ................ 29/525; 29/464; 29/466; 29/468; 29/237; 29/280; 29/709

(58) Field of Classification Search .................... 29/237, 29/280, 709, 525, 464, 466, 468; 285/39, 285/332, 334, 382, 399
See application file for complete search history.

(56) References Cited

U.S. PATENT DOCUMENTS

| | | | | |
|---|---|---|---|---|
| 2,805,591 | A * | 9/1957 | Widmer | 72/360 |
| 3,372,480 | A * | 3/1968 | Rozmus | 30/193 |
| 4,293,147 | A | 10/1981 | Metcalfe et al. | |
| 4,345,361 | A * | 8/1982 | Baumann | 29/237 |
| 4,483,056 | A * | 11/1984 | Schwalm et al. | 29/237 |
| 5,181,752 | A * | 1/1993 | Benson et al. | 285/81 |
| 5,226,231 | A * | 7/1993 | De Leebeeck | 29/237 |
| 5,311,899 | A * | 5/1994 | Isayama et al. | 137/240 |
| 5,513,425 | A | 5/1996 | Williams | |
| 5,537,734 | A * | 7/1996 | Belka et al. | 29/705 |
| 5,640,748 | A * | 6/1997 | Harrison | 29/272 |
| 5,749,604 | A | 5/1998 | Williams | |
| 6,050,608 | A * | 4/2000 | Hattori et al. | 285/39 |
| 6,327,763 | B2 * | 12/2001 | Stephen | 29/272 |
| 6,345,431 | B1 * | 2/2002 | Greig | 29/506 |
| 6,612,010 | B2 * | 9/2003 | Bekkevold et al. | 29/429 |

(Continued)

FOREIGN PATENT DOCUMENTS

| | | |
|---|---|---|
| FR | 2634858 | 2/1990 |

(Continued)

*Primary Examiner* — Essama Omgba
(74) *Attorney, Agent, or Firm* — Deborah Gador

(57) ABSTRACT

A device and method for coupling a pipe and a fitting. The device includes a pipe holder for releasably gripping a pipe, a fitting retainer for releasably retaining a pipe fitting substantially coaxially with a pipe in the pipe holder, and a drive mechanism for driving together the pipe holder and the fitting retainer along a longitudinal axis in a relative motion between them. The device may optionally slide a reinforcing sleeve along the pipe to cover the end of the pipe on the fitting.

18 Claims, 5 Drawing Sheets

U.S. PATENT DOCUMENTS

| | | | | |
|---|---|---|---|---|
| 6,948,222 | B1 | 9/2005 | Greer et al. | |
| 7,325,286 | B2 * | 2/2008 | Bormioli | 29/237 |
| 7,757,366 | B2 * | 7/2010 | Vorley et al. | 29/428 |
| 7,818,857 | B1 * | 10/2010 | Viviano | 29/237 |
| 2004/0128814 | A1 * | 7/2004 | Esson et al. | 29/237 |
| 2005/0120539 | A1 | 6/2005 | Tutt et al. | |

FOREIGN PATENT DOCUMENTS

| | | | |
|---|---|---|---|
| FR | 2801526 | | 6/2001 |
| GB | 2077381 | | 12/1981 |
| GB | 2240599 | | 8/1991 |
| GB | 2240599 | A * | 8/1991 |
| WO | 00/64641 | | 11/2000 |

* cited by examiner

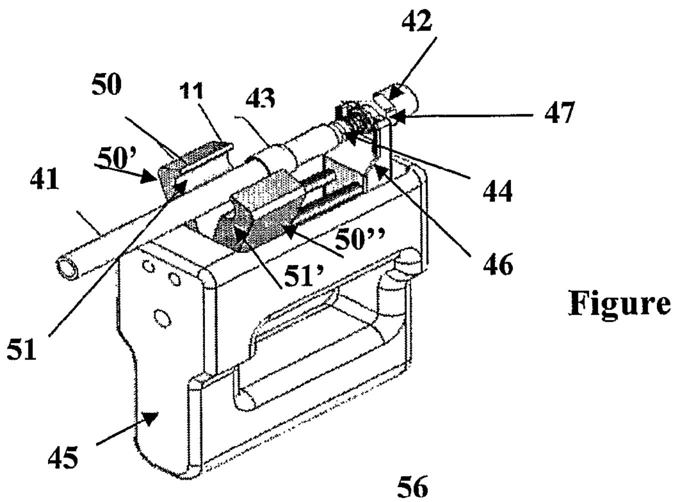
Figure 6
Figure 7
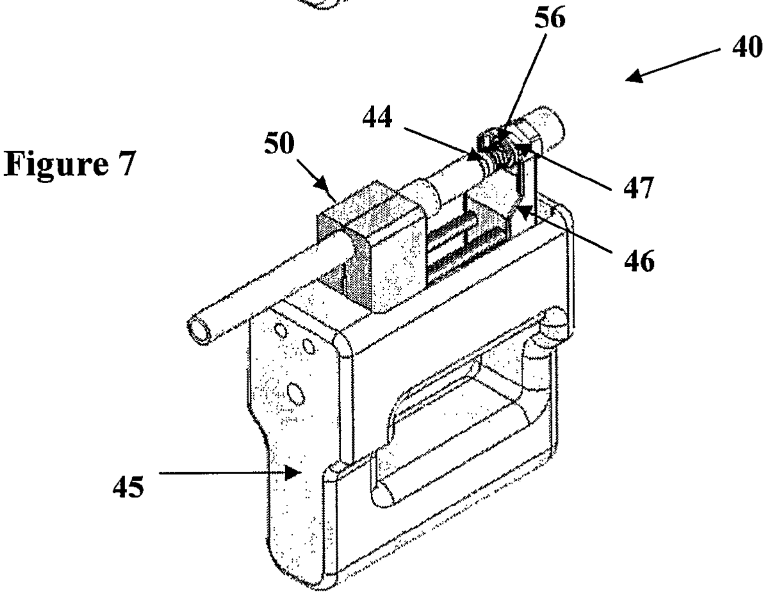
Figure 8
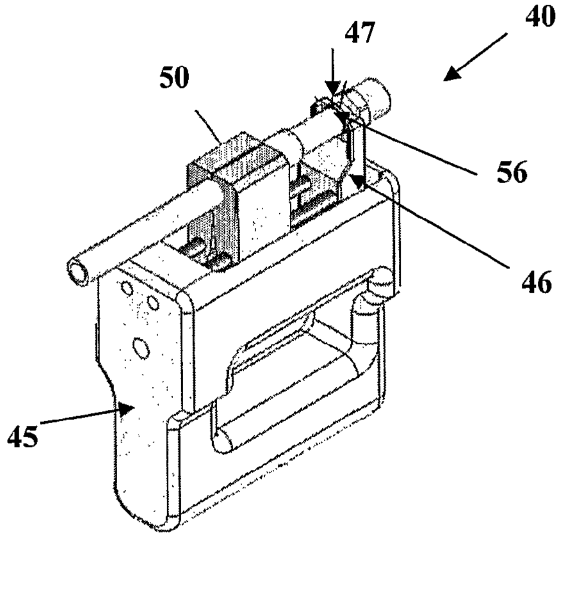

DEVICE AND METHOD FOR COUPLING A PIPE FITTING TO A PIPE

FIELD OF THE INVENTION

The present invention relates to a device and method for coupling pipes, fittings and reinforcing sleeves in general, and, in particular, to devices for automatically coupling pipes, fittings and sleeves in a single operation.

BACKGROUND OF THE INVENTION

The weakest points in hydraulic systems are their joints. That is where leaks are most likely to occur. Consequently, much thought has been given to the design and construction of hydraulic joints. This is as true today, as a wide variety of plastics are used to make the pipes and fittings, as it was in the past, when primarily metal and rubber pipe were used in hydraulic systems.

Plastic pipes are used today because they are relatively inexpensive and can be designed for a wide variety of applications. PEX and PEX-Al-PEX pipes, for example, were designed for heating systems and are now also used for chemical and sewage transport.

When plastic pipe is used, it is typically pushed over a mating portion of a fitting which is a bit larger in diameter than the inside of the pipe. This causes the pipe to stretch and creates a press-fit which helps to make a leak-proof seal. However, stretching the plastic decreases its wall thickness, thereby weakening that part of the pipe at the joint. To compensate for this inherent weakness, reinforcement sleeves are used to strengthen the joint and make them more leak-proof.

There is shown, for example, in U.S. Pat. No. 4,293,147, to Metcalfe et al., a method for connecting a plastics pipe to a fitting incorporating an externally grooved insert. The insert, which is a tight fit in the pipe, is forced into the end of the pipe, and a sleeve, previously located on the pipe, is then forced to the end of the pipe so that the pipe end is tightly gripped between the insert and the sleeve. The insert is tubular and is provided with a plurality of circumferential grooves in its outer surface. Each groove has in axial section, substantially straight sides and a straight base, the angle between the base and each side being obtuse. Insertion of the insert causes the external diameter of the pipe to increase so as to be greater than the internal diameter of the sleeve. This is a slow manual process which depends upon the manual dexterity and strength of the operator.

Soft flexible plastic pipes can be assembled on fittings manually. Reinforcing sleeves that screw onto the fitting are often employed to simplify assembly.

When relatively hard pipes are needed, manual assembly is time-consuming, as the pipe is difficult to mount over the fitting. In such cases, another step is employed to form a bell-shaped opening at the end of the pipe. In this step, the end of the pipe is forced over a bell-shaped die, which expands the pipe to such an extent that it can be slipped onto the fitting. Once mounted on the fitting, a sleeve is either crimped over the coupling or pushed into place. As this is very time-consuming and requires the application of force, a number of devices have been developed that assist the coupling process. Two examples are as follows.

U.S. Pat. No. 6,050,608, to Hattori et al., describes a fitting for a plastic pipe comprising two parts, that is, a fitting main body and a retaining ring put over the top end of a plastic pipe. A hole is pierced in the circumferential surface of the retaining ring for moving the top end of the plastic pipe, together with the retaining ring, to a flange on the fitting. A plurality of large diameter portions of fitting main body diametrically enlarge the top end portion of the plastic pipe to which the inner core is inserted, and the retaining ring compresses the top end portion of the pipe onto the fitting, thereby preventing the mounted plastic pipe from slipping off. The inherent flaw in this design is the need to pierce, and consequently further weaken, the pipe particularly in the region where it has already been stretched.

U.S. Pat. No. 5,749,604, to Williams, describes a coupling system for copper pipes in which a tapered wall is formed on one of two tubular pipe members for press-fit engagement with a wall of the second pipe member, and the two pipe members are pressed together in an axial direction to bring the tapered wall and the other wall into direct press-fit engagement with each other. The two pipe members can, for example, be a length of copper water pipe and a copper pipe fitting, and in certain disclosed embodiments, the pipe members are drawn together by a tool having axially movable jaws which engage the pipe members and are driven together in the axial direction by an actuator and linkage which move in a perpendicular direction. As this invention was designed to create press-fit couplings in copper pipe, it has no sleeve mounting operation.

Accordingly, there is a long felt need for a method and device which mounts a pipe on a fitting in one smooth operation that includes the assembly of a sleeve and ensures a leak-proof seal without damaging any of the components and in a single operation.

SUMMARY OF THE INVENTION

The present invention relates to a method and device for automatically coupling a pipe and fitting, and possibly an optional sleeve, in such a way as to create a reliable, leak-proof seal, in one smooth operation.

The invention includes means for holding the pipe, sleeve and fitting along the same longitudinal axis and drawing them together, the fitting being held in a retainer, the pipe being firmly gripped by a set of retractable jaws and a sleeve being pre-mounted on the pipe, the device further including means for driving the retainer and the jaws towards one another.

According to one embodiment, the retractable jaws are held open by springs, and shut by a retractable wedge that drives the jaws to pivot shut and firmly grip the pipe. Once the parts are held in place, they are brought together by a powered drive mechanism. All stages of the assembly are performed automatically by one device.

In the first step of the automatic process, the pipe is gripped in such a way that it will not slip when mounted on the fitting. The mating portion of the fitting is slightly larger in diameter than the inside of the pipe. When assembled, this creates a tight fit. Mounting a pipe on a fitting requires that the grip on the pipe be stronger than the force needed to mount the pipe.

If a reinforcement sleeve is required, it can be slidingly pre-mounted on the pipe and a similar process is employed to assemble the components: The jaws grip the pipe just behind the sleeve and move the pipe onto the fitting. Once the components are assembled, the jaws release their grip on the pipe and continue moving towards the fitting, using their leading edge to push the sleeve into place.

The sleeve fits loosely over the pipe prior to assembly, and forms a press fit at the coupling area when assembled. If crimping is required, the jaws open further, move over the sleeve, and shut tightly around the sleeve, crimping it in place.

In an alternative embodiment of this invention, the pipe is held in place and the retainer moves the fitting into place inside the pipe. In this case, the jaws release their grip of the pipe after the fitting is inserted in the pipe. The retainer continues its forward motion pushing the pipe through the sleeve, which is held in place by the leading edge of the jaws. The retainer continues moving until the sleeve is forced into position.

BRIEF DESCRIPTION OF THE DRAWINGS

The present invention will be further understood and appreciated from the following detailed description taken in conjunction with the drawings in which:

FIG. 2, FIG. 3 and FIG. 4 are partially cut-away side views illustrating the coupling method for coupling a plastic pipe, reinforcing sleeve and a fitting in one embodiment of the invention in which FIG. 2 is a view showing a state just before the start of the coupling operation, FIG. 3 is a view showing the state after the pipe is connected to the fitting, and FIG. 4 is a view showing the state after the sleeve is mounted.

FIG. 6 through FIG. 10 illustrate the operation of a hand-held embodiment of the device described in this invention.

DETAILED DESCRIPTION OF THE INVENTION

The present invention relates to a device and method for automatically coupling a plastic pipe to a fitting, possibly with a locking sleeve, in a single operation, which ensures a leak-proof seal.

Figure 1:
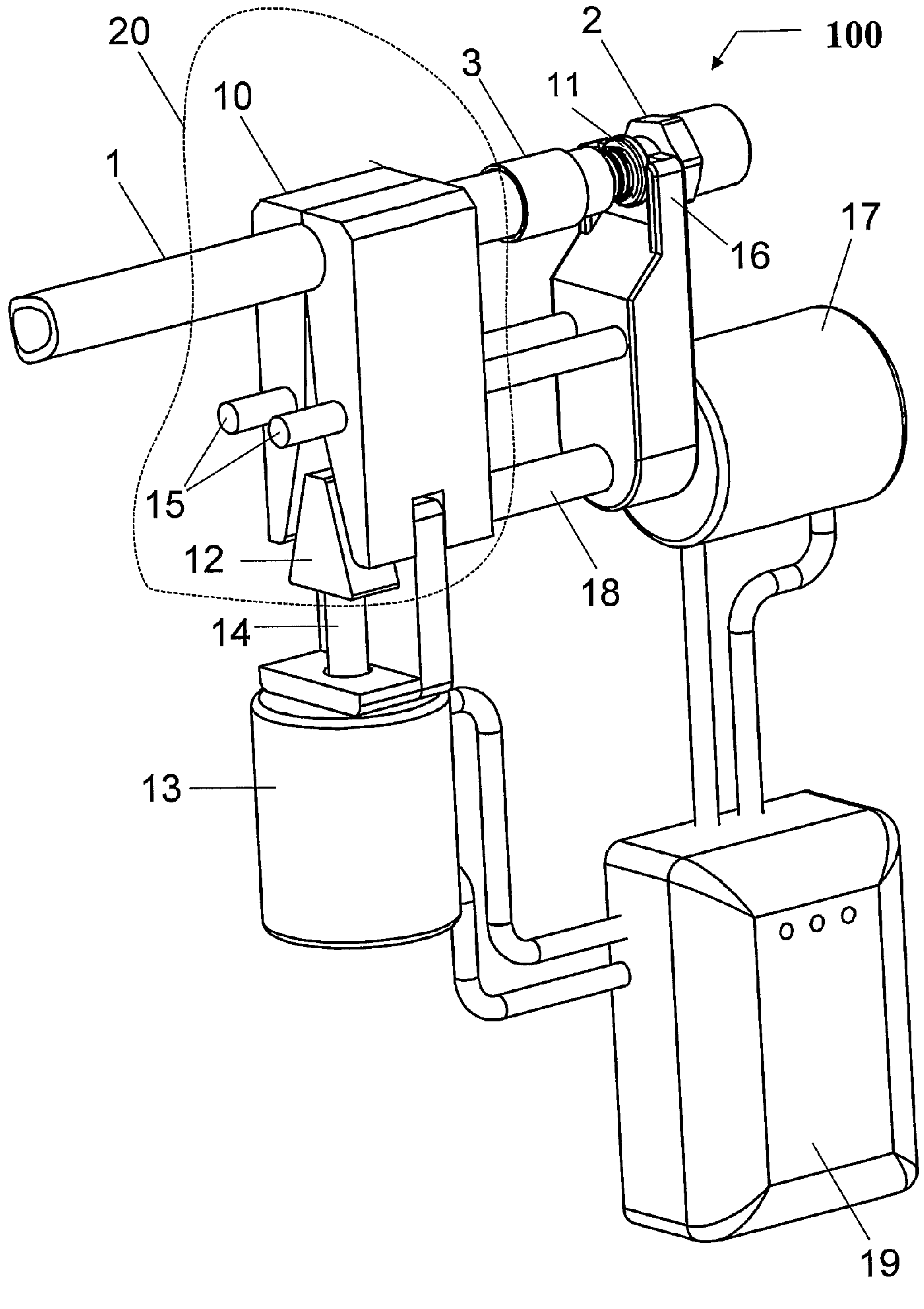
FIG. 1 is a schematic illustration of a device for coupling pipes, sleeves and fittings constructed and operative in accordance with one embodiment of the present invention.

FIG. 1 is a schematic illustration of a pipe coupling device 100 constructed and operative in accordance with one embodiment of the present invention, highlighting the main mechanical elements of the device. The device includes a pipe holder 20 for releasably gripping the pipe, a fitting retainer 16 for releasably holding the fitting on a pre-selected longitudinal axis substantially co-axially with the pipe held in the pipe holder.

The device further includes a drive mechanism 17 for driving together the pipe holder and the fitting retainer in a relative motion between them, drawing the pipe and the fitting together for coupling. According to a preferred embodiment of the invention, the fitting is held in a retainer in the device, the pipe is firmly gripped by a set of retractable jaws, and a sleeve is pre-mounted on the pipe. The invention also includes a control unit which coordinates the movement of all the elements of the device.

The pipe holder 20 for gripping a pipe 1, according to one embodiment of the invention, includes a pair of pivoting spring-loaded jaws 10 and a pair of stationary rods 15. Each jaw 10 pivots around a stationary rod 15. A retractable wedge 12 is used to shut the jaws 10 by driving them to pivot around the rods 15 towards each other. The wedge 12 may be driven by a hydraulic piston 13, lead screw or other mechanical actuating means. These elements will collectively be referred to in the description below as "pipe holder 20". When the jaws 10 are shut, they serve to position the pipe concentrically with, and along substantially the same axis as a pipe fitting 2 held by retainer 16 opposite jaws 10. It will be appreciated that the pipe holder may include more than one pair of jaws. It will be further appreciated that other means for gripping the pipe can alternatively be employed.

According to the present invention, retainer 16 defines a concave recess 11 (illustrated more clearly in FIG. 10) which is adapted and configured for holding fitting 2 substantially co-axially with pipe 1. Rods 15 may be used to align the jaws 10 with the retainer 16, ensuring that the coupling operation does not unnecessarily distort or damage the pipe, fitting or sleeve. Any suitable drive mechanism 17 may be utilized for driving the pipe and fitting together, for example an hydraulic piston, as shown in this embodiment, a motor operated lead screw, or other mechanical, pneumatic or other means.

The pipe holder 20, fitting retainer 16 and the drive mechanism 17 are coupled to a control unit 19, which controls their motion. Control unit 19 causes a relative movement between pipe holder 20, coupled on a sliding shaft 18, and retainer 16, mounted on shaft 18, causing concomitant motion between the pipe 1 and the fitting 2. According to one embodiment of the present invention, the retainer 16 is held in a stationary position while the jaws 10 are driven towards it. According to another embodiment of the present invention, the jaws 10 are stationary while the retainer 16 is driven towards them.

Figure 2:
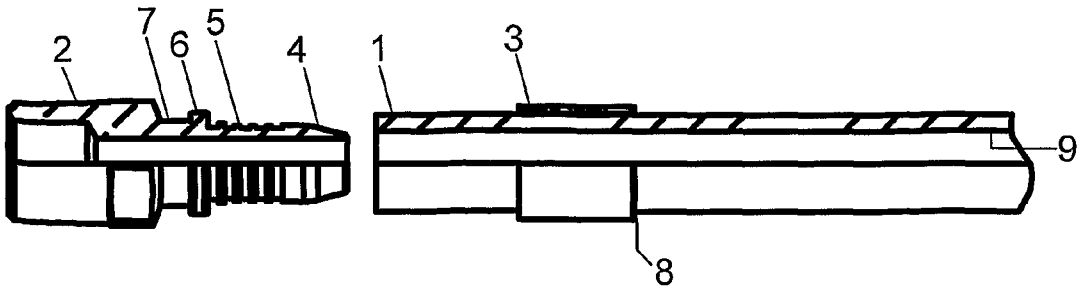

FIG. 2 shows one set of components which may be assembled by the device of this invention. Those components include a plastic pipe 1, a pipe fitting 2 particularly useful in the present invention, and a sleeve 3. The plastic pipe 1 may be a single-layer or multi-layer pipe, particularly PEX and Alu-PEX pipes as known, while the sleeve 3 and fitting 2 may be formed of metal or plastic. Fitting 2 includes a tapered end 4 facing pipe 1. When tapered end 4 is inserted into pipe 1, it causes the end of pipe 1 to gradually expand as it is being mounted on the fitting 2. The outside diameter of the mating portion of fitting 2 is somewhat larger than the inner diameter of the pipe. When assembled, the difference in size creates a "press fit". It will be appreciated that this design obviates the need for a separate tool for expanding the end of the pipe.

According to one embodiment of the invention the fitting includes a plurality of ridges 5, which also aid in gripping the pipe and sealing the connection. When a pipe 1 is mounted over the ridges 5, the inside surface of the pipe 1 expands slightly into the recesses between the ridges 5, further improving the grip of pipe by the fitting and the seal. A stopper 6 on the fitting 2 is preferably provided to help position the pipe and sleeve properly on the fitting. A recess 7 is typically provided on the fitting 2 and is used to position the fitting 2 properly in concave recess 11 of retainer 16 of the device used to assemble the components.

Figure 3:
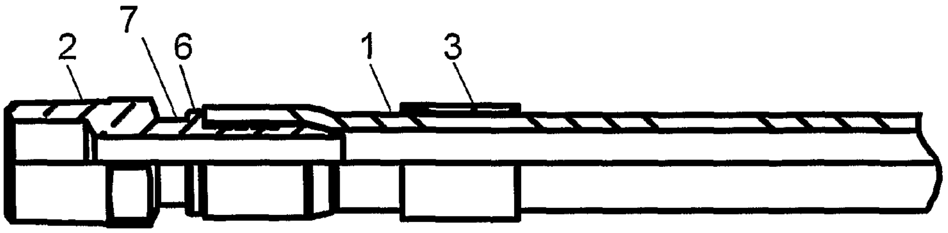

FIG. 3 is a partially cut-away side view illustrating the way in which pipe 1 is mounted onto the fitting 2. It can be seen that the front end of the pipe 1 abuts the stopper 6 of fitting 2. FIG. 3 further shows that the pipe expands as it is mounted on the fitting. As with conventional pipe fittings, expanding pipe 1 over the coupling portion of the fitting 2 causes the wall thickness of the pipe 1 to thin and weaken.

Figure 4:
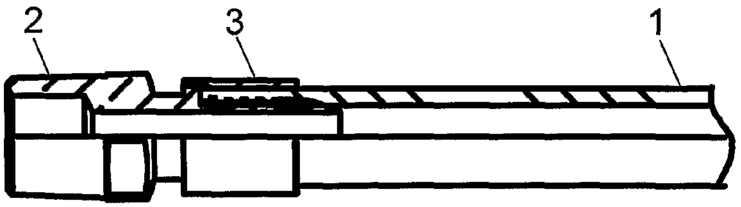

FIG. 4 is a partially cut-away side view illustrating the addition of a reinforcement sleeve 3 upon the joint. Sleeve 3 forces more pipe 1 material into the recesses between the ridges 5 of the fitting, further sealing the joint. Sleeve 3 also provides reinforcement for the thinned pipe portion and strengthens the joint where the pipe 1 is weakest.

Figure 5A:
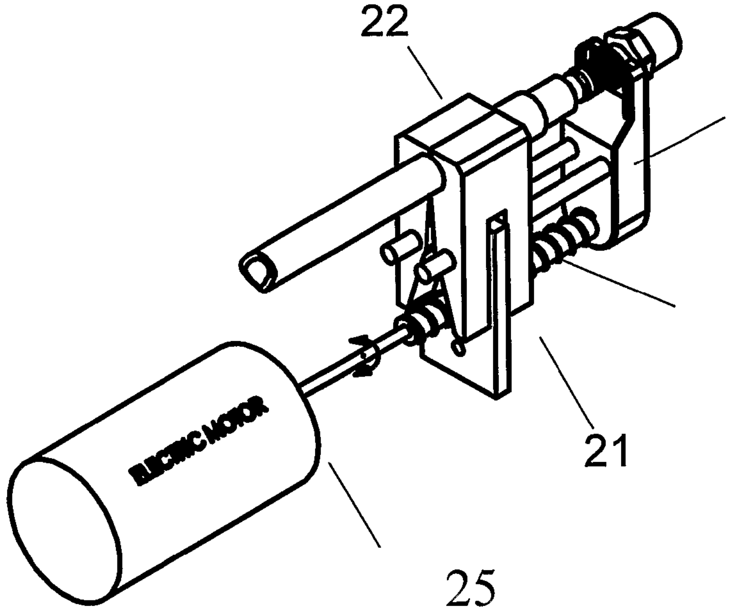
FIG. 5*a* and FIG. 5*b* illustrate two possible options for the drive mechanism of the device described in this invention.
Figure 5B:
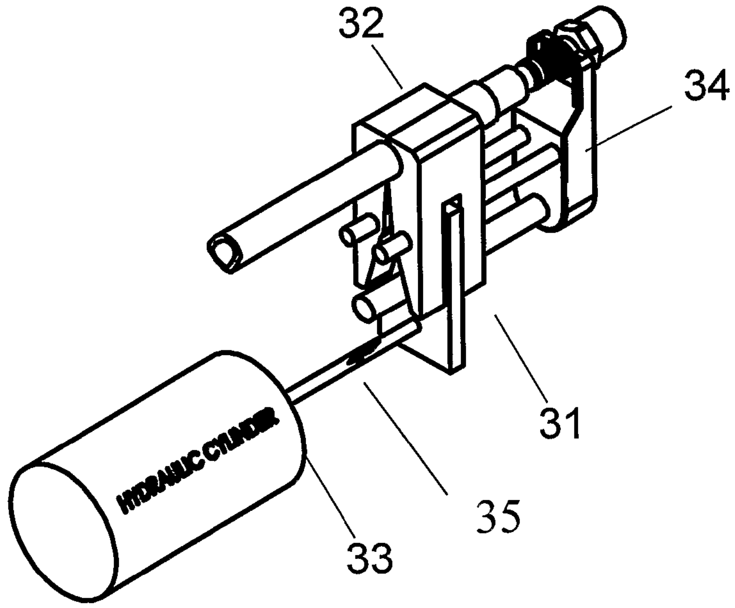

FIG. 5*a* and FIG. 5*b* are schematic illustrations of pipe coupling devices according to alternative embodiments of the invention having different types of drive mechanisms.

FIG. 5*a* illustrates a pipe coupling device 21 with a pipe holder 22 and a fitting retainer 24 coupled for relative movement by means of lead screw 23 driven by a motor 25. FIG. 5*b* shows a pipe coupling device 31 having a pipe holder 32 and a fitting retainer 34 coupled for relative motion by means of a shaft 35 actuated by an hydraulic piston 33. These drive mechanisms are used to push the pipe onto the fitting, or alternatively, pull the fitting into the pipe. It will be appreciated by those skilled in the art that, according to alternative embodiments, the drive mechanisms may be manual.

FIG. 6 through FIG. 10 illustrate schematically a pipe coupling device 40, according to one embodiment of the invention, in operation. In this embodiment, all the elements of the device 40, including a pipe holder 50, a fitting retainer 46, a drive mechanism (not shown) and a controller (not shown), are built into a convenient hand-held housing 45.

FIG. 6 shows a pipe 41 and fitting 42 ready for coupling by device 40. Pipe 41 is disposed for engagement by pipe holder 50. Fitting 42 is seated in the fitting retainer 46 of the device. A recess 47 on the fitting may be provided for engagement by a concave recess 58 in retainer 46 (seen most clearly in FIG. 10). The retainer 46 holds the fitting 42 in a selected orientation, substantially co-axially with pipe 41 in pipe holder 50. If a sleeve 43 is desired, it is slideably pre-mounted on the pipe 41, as illustrated. The inner diameter of sleeve 43 is slightly larger than the outer diameter of the pipe 41. The end of pipe 41 is slipped onto the tapered end 44 of the fitting. The pipe 41 may rest on the pipe holder 50, here illustrated as a pair of jaws 50' and 50" in an open position, until the coupling operation is initiated. Part of the inner surface of jaw 50' facing pipe 41 includes arcuately shaped surface 51 and jaw 50" includes a complementary arcuately shaped surface 51', for firmly engaging yet not crushing pipe 41.

FIG. 7 shows pipe 41 tightly gripped by jaws 50' and 50" of the pipe holder 50. Engagement by the arucate surfaces 51, 51' of the jaws is strong enough to hold the pipe 41 without slippage, yet without distortion, as the pipe 41 is forced onto the fitting by the relative motion between the jaws and the retainer 46. The sleeve 43 is displaced toward fitting 42 by the displacement of the pipe.

Once the leading edge of the pipe abuts a stopper 56 on the fitting, as shown in FIG. 8, the amount of power required to continue the relative motion increases dramatically. The built-in controller senses this increase and causes jaws 50' and 50" to retract from the pipe 41, thus loosening their grip on the pipe. It will be appreciated that the device 40 may alternatively include other means for sensing when the leading edge of the pipe abuts stopper 56, such as optic sensors, limit switches etc. Alternatively, other means for determining when the pipe is seated satisfactorily on the fitting may be utilized, instead of a stop member.

Figure 9:
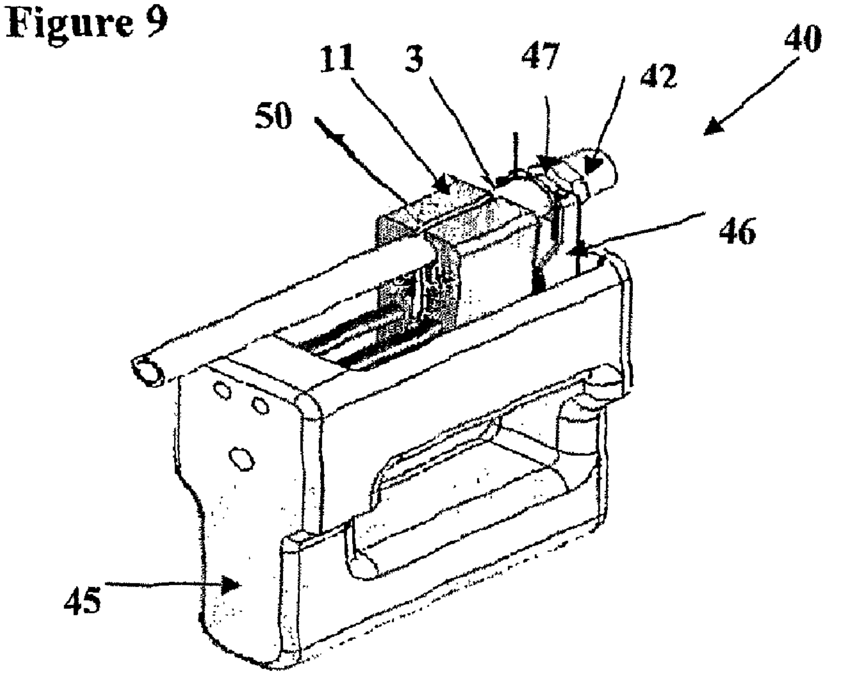
Figure 10:
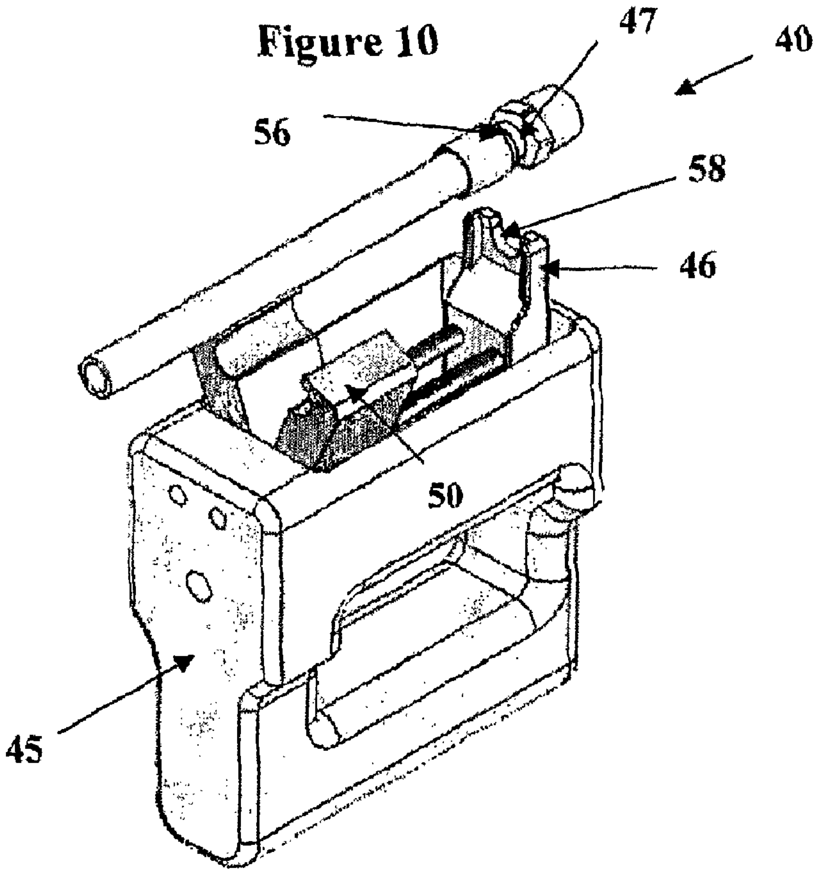

In the illustrated embodiment, where a reinforcing sleeve has been mounted on the pipe, the controller limits the retraction of the jaws away from pipe 41 to a point where the cross section of arcuate surface 51 and complementary arcuate surface 51' does not exceed the outer diameter of sleeve 43. Now, the controller causes the slightly loosened jaws to continue their relative motion towards fitting 42, as shown in FIG. 9. During this stage of the device operation, the leading surfaces of jaws 50' and 50" abut rear edge of sleeve 43 and push sleeve 43 onto the end portion of the pipe substantially covering the gripping ridges 5 (shown in FIG. 2) of the fitting. When the leading edge of sleeve 43 is in place where the leading surfaces of the jaws abut retainer 46 or alternatively the leading edge of sleeve 43 abuts stopper 56, the power required to continue the relative motion again increases dramatically. The controller senses this increase and causes the jaws to stop their relative forward motion, retract the jaws completely and move the jaws to the original position. Pipe holder 50 is now fully open and pipe 41 coupled to the fitting 42 can be removed from the device, as shown in FIG. 10.

It will be appreciated by those skilled in the art that the device 40 may, alternatively, include other means for sensing when the leading edge of sleeve 43 abuts stopper 56, such as optic sensors, limit switches etc., or means other than a stopper to indicate when the sleeve 43 is in place.

If a crimping operation is desired (not shown), the controller senses that the power required to continue the relative motion increases dramatically and causes jaws 50' and 50" to retract from the pipe 41. The controller limits the retraction of the jaws away from sleeve 43 to a point where the cross section of arcuate surfaces 51 and 51' slightly exceeds the outer diameter of sleeve 43.

At this stage of the device operation, the controller causes the pipe holder to move substantially over or around sleeve 43. According to this embodiment of the invention, retainer 46 is adapted and configured so as to allow jaws 50' and 50" to continue their relative motion until they are positioned substantially over and around sleeve 43 (not shown) as required, or until they abut stopper 56. When in position, the controller causes pipe holder 50 to pinch the sleeve 43, causing it to crimp. The controller now causes pipe holder 50 to fully open and move the jaws to the original position. The assembly of the coupled pipe and fitting having a crimped sleeve can be removed from the device.

While the invention has been described with respect to a limited number of embodiments, it will be appreciated that many variations, modifications and other applications of the invention may be made. It will further be appreciated that the invention is not limited to what has been described hereinabove merely by way of example. Rather, the invention is limited solely by the claims which follow.

The invention claimed is:

1. A device for coupling a pipe and a fitting, the device comprising a shaft;

a pipe holder, slidably mounted on said shaft, for releasably gripping a pipe;

said pipe holder including at least one pair of retractable jaws, each jaw pivotally mounted on a stationary rod;

a fitting retainer, mounted on said shaft, for releasably holding a pipe fitting substantially co-axially with a pipe in said pipe holder;

a drive mechanism driving together said pipe holder and said fitting retainer along said shaft in a relative sliding motion between them for coupling a pipe in said pipe holder to a fitting in said fitting retainer;

a mechanism causing said retractable jaws to retract partially; and said drive mechanism driving said pipe holder and said fitting retainer further together to cause said retractable jaws to push a sleeve pre-mounted on said pipe slidingly onto a portion of said pipe mounted on said fitting.

2. The device according to claim 1, wherein said mechanism for causing retracting comprises:

a retractable wedge adapted and configured for driving each of said jaws to pivot towards the other around its said stationary rod for releasably engaging a pipe therebetween; and actuating means for driving said wedge.

3. The device according to claim 2, further including a controller for automatically controlling said drive mechanism for driving said pipe holder and said fitting retainer in a relative movement therebetween, and wherein said controller further controls said actuating means for automatically driving said retractable wedge to shut and retract said jaws.

4. The device according to claim 1, wherein said retractable jaws are spring-loaded and adapted and configured for retractably moving away from a pipe held between said jaws for loosening a grip of said jaws on said pipe.

5. The device according to claim 1, wherein said drive mechanism is a manual drive mechanism.

6. The device according to claim 1, further comprising a control unit for automatically controlling the motion of said pipe holder, said fitting retainer, said mechanism for causing retracting and said drive mechanism.

7. The device according to claim 1, further including sensing means, coupled to said drive mechanism, for sensing when a leading edge of said sleeve pre-mounted on said pipe abuts said stopper and provide an indication thereof; said mechanism causing retraction causing said pipe holder to retract completely in response to said indication.

8. The device according to claim 1, wherein said sensing means comprises an optical sensor.

9. The device according to claim 1, wherein said sensing means comprises a limiting switch.

10. The device according to claim 1, wherein said jaws are pivotally and slidably mounted on said stationary rods.

11. The device according to claim 1, further comprising sensing means, coupled to said drive mechanism, for sensing abutting of a pipe against a stopper of a fitting in said fitting retainer to indicate when a pipe abuts against a stopper; and a mechanism causing said pipe holder to retract partially in response to said indication.

12. A method for coupling a pipe and a fitting, the method comprising:

pre-mounting a reinforcing sleeve on a pipe;

gripping said pipe by at least one pair of retractable jaws, each jaw pivotally mounted on a stationary rod, said pair of retractable jaws being slidably mounted on a shaft;

retaining a pipe fitting substantially coaxially with a pipe in said pipe holder by a pipe fitting retainer, having a stopper, on said shaft;

driving together said retractable jaws and said fitting retainer along said shaft in a relative sliding motion between them until said said retractable jaws move said pipe onto said fitting to abut said stopper;

retracting said retractable jaws from said pipe, not to exceed an outer diameter of said reinforcing sleeve, when said pipe holder abuts a stopper on said fitting; and driving said pipe holder and said fitting retainer further together so that said jaws push said sleeve slidingly onto a portion of said pipe mounted on said fitting.

13. The method according to claim 12, wherein said steps of driving together, sensing and retracting are performed automatically in a single operation.

14. The method for coupling a pipe and a fitting according to claim 12, further comprising the step of sensing abutting of said pipe against said stopper and, in response thereto, partially retracting said retractable jaws.

15. The method for coupling a pipe and a fitting according to claim 12, wherein said steps of driving are performed by a manual driving mechanism.

16. The method according to claim 12, further comprising:

sensing said sleeve abutting said stopper; and retracting said pipe holder after said step of sensing said sleeve abutting said stopper.

17. The method according to claim 16, further comprising the step of returning said pipe holder and said fitting retainer to an original position after said step of retracting.

18. A device for coupling a pipe and a fitting, the device comprising a shaft;

a pipe holder, mounted on said shaft, for releasably gripping a pipe;

said pipe holder including at least one pair of retractable jaws, each jaw pivotally mounted on a stationary rod;

a fitting retainer, slidably mounted on said shaft, for releasably holding a pipe fitting substantially co-axially with a pipe in said pipe holder;

a drive mechanism driving together said pipe holder and said fitting retainer along said shaft in a relative sliding motion between them for coupling a pipe in said pipe holder to a fitting in said fitting retainer;

a mechanism causing said pipe holder to retract partially; and said drive mechanism driving said pipe holder and said fitting retainer further together to cause said pipe holder to push a sleeve pre-mounted on said pipe slidingly onto a portion of said pipe mounted on said fitting.

* * * * *